United States Patent
Hirota et al.

(10) Patent No.: US 10,082,321 B2
(45) Date of Patent: Sep. 25, 2018

(54) ADSORPTION HEAT PUMP SYSTEM AND COOLING GENERATION METHOD

(71) Applicant: KABUSHIKI KAISHA TOYOTA CHUO KENKYUSHO, Nagakute-shi, Aichi-ken (JP)

(72) Inventors: Yasuki Hirota, Nagakute (JP); Takafumi Yamauchi, Nagakute (JP); Ryuichi Iwata, Nagakute (JP); Takashi Shimazu, Nagakute (JP)

(73) Assignee: KABUSHIKI KAISHA TOYOTA CHUO KENKYUSHO, Nagakute (JP)

(*) Notice: Subject to any disclaimer, the term of this patent is extended or adjusted under 35 U.S.C. 154(b) by 45 days.

(21) Appl. No.: 14/625,938

(22) Filed: Feb. 19, 2015

(65) Prior Publication Data

US 2015/0267947 A1    Sep. 24, 2015

(30) Foreign Application Priority Data

Mar. 24, 2014  (JP) .................................. 2014-060600

(51) Int. Cl.
  *F25B 30/04*    (2006.01)
  *F25B 17/08*    (2006.01)

(52) U.S. Cl.
  CPC ............ *F25B 30/04* (2013.01); *F25B 17/083* (2013.01); *Y02A 30/278* (2018.01); *Y02B 30/64* (2013.01)

(58) Field of Classification Search
  CPC ............................. F25B 17/083; F25B 30/04
  See application file for complete search history.

(56) References Cited

U.S. PATENT DOCUMENTS

| | | | |
|---|---|---|---|
| 4,333,515 A * | 6/1982 | Wilkinson | F25B 15/006 62/101 |
| 5,505,059 A | 4/1996 | Sanborn | |
| 5,619,866 A * | 4/1997 | Sato | F25B 17/083 62/106 |
| 5,628,205 A | 5/1997 | Rockenfeller et al. | |
| 5,775,126 A | 7/1998 | Sato et al. | |
| 6,625,388 B2 | 9/2003 | Winter et al. | |
| 7,810,342 B2 | 10/2010 | Matsui et al. | |
| 7,997,098 B2 | 8/2011 | Yabu et al. | |

(Continued)

FOREIGN PATENT DOCUMENTS

| | | |
|---|---|---|
| JP | H05248727 A | 9/1993 |
| JP | H08240357 A | 9/1996 |

(Continued)

OTHER PUBLICATIONS

Yoshimi et al., Dec. 5, 2000; PAJ, JP 2000-130877, all.*

(Continued)

*Primary Examiner* — Filip Zec
(74) *Attorney, Agent, or Firm* — Oliff PLC

(57) ABSTRACT

An adsorption heat pump system includes a first adsorption device that adsorbs an adsorbate, and that regenerates on heating to a regeneration temperature or above; a second adsorption device that adsorbs an adsorbate, and that regenerates on heating to a regeneration temperature or above; and a vapor supply member that evaporates the adsorbate and supplies adsorbate vapor to the first adsorption device and the second adsorption device at different respective pressures.

10 Claims, 12 Drawing Sheets

(56) References Cited

U.S. PATENT DOCUMENTS

| | | | |
|---|---|---|---|
| 2010/0058804 A1* | 3/2010 | Monereau | B01D 53/0431 62/642 |
| 2010/0300124 A1 | 12/2010 | Braunschweig et al. | |
| 2011/0283736 A1* | 11/2011 | Manabe | F25B 30/04 62/476 |
| 2012/0264600 A1* | 10/2012 | Tso | B01J 20/046 502/405 |
| 2013/0276475 A1* | 10/2013 | Aso | F25B 17/083 62/477 |
| 2014/0053577 A1 | 2/2014 | Hirota et al. | |
| 2015/0159923 A1 | 6/2015 | Akisawa et al. | |

FOREIGN PATENT DOCUMENTS

| | | |
|---|---|---|
| JP | H09303900 A | 11/1997 |
| JP | H10-332218 A | 12/1998 |
| JP | 2000-130877 A | 5/2000 |
| JP | 2001-141327 A | 5/2001 |
| JP | 2005029460 A | 2/2005 |
| JP | 2005-214552 A | 8/2005 |
| JP | 2006-300414 A | 11/2006 |
| JP | 2010-151386 A | 7/2010 |
| JP | 2014-040959 A | 3/2014 |
| WO | 2014/003013 A1 | 1/2014 |

OTHER PUBLICATIONS

Machine translation of JP 2006-300414, Inaoka et al., Nov. 2, 2006, PAJ, all.*
Mar. 1, 2016 Office Action issued in Japanese Patent Application No. 2014-060600.
Nov. 23, 2015 Extended Search Report issued in European Patent Application No. 15156939.9.
Jun. 14, 2016 Office Action issued in Japanese Patent Application No. 2014-135086.
Oct. 11, 2016 Office Action issued in U.S. Appl. No. 14/625,905.
Jul. 14, 2017 Office Action Issued in U.S. Appl. No. 14/625,905.
Apr. 5, 2018 Office Action Issued in U.S. Appl. No. 14/625,905.

* cited by examiner

ADSORPTION HEAT PUMP SYSTEM AND COOLING GENERATION METHOD

CROSS-REFERENCE TO RELATED APPLICATION

This application is based on and claims priority under 35 USC 119 from Japanese Patent Application No. 2014-060600 filed on Mar. 24, 2014, the disclosure of which is incorporated by reference herein.

BACKGROUND OF THE INVENTION

Field of the Invention

The present invention relates to an adsorption heat pump system and a cooling generation method.

Description of the Related Art

Japanese Patent Application Laid-Open (JP-A) No. 2010-151386 describes a configuration as an adsorption heat pump including a pair of adsorption devices, a condenser, and an evaporator.

In adsorption heat pumps with such the configuration, it is difficult to obtain coolings effectively when there is a large temperature difference (temperature swing) between adsorption and desorption in the adsorption devices.

SUMMARY

In consideration of the above circumstances, an object of the present invention is to obtain an adsorption heat pump system and cooling generation method capable of efficient cooling generation.

According to a first aspect of the invention, there is provided an adsorption heat pump system including a first adsorption device that adsorbs an adsorbate, and that regenerates on heating to a regeneration temperature or above; a second adsorption device that adsorbs an adsorbate, and that regenerates on heating to a regeneration temperature or above; and a vapor supply member that evaporates the adsorbate and supplies adsorbate vapor to the first adsorption device and the second adsorption device at different respective pressures.

In this adsorption heat pump system, the vapor supply member evaporates the adsorbate to generate cooling. The adsorbate vapor is adsorbed in the first adsorption device and the second adsorption device. The first adsorption device regenerates on heating to the regeneration temperature of the first adsorption device, or above. The second adsorption device regenerates on heating to the regeneration temperature of the second adsorption device, or above. Regeneration enables the first adsorption device and the second adsorption device to adsorb adsorbate vapor again.

The vapor supply member supplies the adsorbate vapor to the first adsorption device and the second adsorption device at different respective pressures. The pressure (relative pressure) of at least one out of the first adsorption device or the second adsorption device can thus be raised during adsorption, enabling more of the adsorbate to be adsorbed by the adsorbent, and thereby enabling efficient cooling generation. Using an adsorbent with a small temperature difference between adsorption and desorption enables loss due to sensible heat to be reduced during adsorption and desorption.

According to a second aspect of the present invention, in the first aspect of the adsorption heat pump system, the vapor supply member may include an evaporator provided with a high pressure chamber and a low pressure chamber having different operating pressures; a first pipe connecting the first adsorption device to either the high pressure chamber or the low pressure chamber; and a second pipe connecting the second adsorption device to the other of the high pressure chamber or the low pressure chamber.

Accordingly, the evaporator is configured with the high pressure chamber and the low pressure chamber during operation of the evaporator. The simple structure including the first pipe and the second pipe enables the first adsorption device to be connected to either the high pressure chamber or the low pressure chamber, and the second adsorption device to be connected to the other out of the high pressure chamber or the low pressure chamber, enabling the vapor to be supplied to a first adsorption device and a second adsorption device at different respective pressures.

According to a third aspect of the present invention, in the second aspect of the adsorption heat pump system, the evaporator may include a partitioning member partitioning between the high pressure chamber and the low pressure chamber.

Accordingly, the evaporator can accordingly be configured with the high pressure chamber and the low pressure chamber by the simple structure of partitioning the evaporator using the partitioning member.

According to a fourth aspect of the present invention, in any one of the first aspect to the third aspect of the adsorption heat pump system, an adsorbent in the first adsorption device and an adsorbent in the second adsorption device may have different characteristics to each other.

In this way, employing adsorbents with different characteristics to each other for the first adsorption device and the second adsorption device enables efficient adsorption of the vapor supplied at different pressures.

According to a fifth aspect of the present invention, in any one of the first aspect to the fourth aspect of the adsorption heat pump system, the second adsorption device may be regenerated utilizing heat of adsorption of the first adsorption device.

Namely, utilizing the heat of adsorption of the first adsorption device in regeneration of the second adsorption device enables effective utilization of the heat of adsorption of the first adsorption device.

According to a sixth aspect of the present invention, in the second aspect of the adsorption heat pump system, the first pipe may connect the low pressure chamber and the first adsorption device together, and the second pipe may connect the high pressure chamber and the second adsorption device together.

Accordingly, vapor from the low pressure chamber can accordingly be supplied to the first adsorption device through the first pipe, and vapor from the high pressure chamber can be supplied to the second adsorption device through the second pipe. Since the second adsorption device is at high pressure during adsorption, the adsorbent is able to adsorb more of the adsorbate.

According to a seventh aspect of the present invention, in any one of the first aspect to the sixth aspect of the adsorption heat pump system, the adsorption capacity of the first adsorption device may be greater than the adsorption capacity of the second adsorption device.

Accordingly, when the first adsorption device has a large heat capacity, the first adsorption device readily adsorbs the vapor even when low pressure vapor from the low pressure chamber moves to the first adsorption device, thereby enabling efficient cooling generation using vapor at low pressure.

According to a eighth aspect of the present invention, in the second aspect of the adsorption heat pump system, the adsorption heat pump system may comprises a plurality of the second adsorption devices, wherein, the plurality of second adsorption devices respectively may switch between adsorption of the vapor supplied from the evaporator, and regeneration utilizing heat received from the first adsorption device.

Accordingly, regenerating the other of the plural second adsorption devices while performing vapor adsorption in a part of the plural second adsorption devices, and switching appropriately therebetween, enables continuous vapor adsorption overall by the plural second adsorption devices.

According to a ninth aspect of the present invention, in any one of the first aspect to the eighth aspect of the adsorption heat pump system, water vapor may be a medium for heat transfer from the first adsorption device to the second adsorption device and for cooling the second adsorption device.

Since water vapor has less sensible heat than liquid water, efficient heat transmission between the first adsorption device and the second adsorption device, and efficient cooling of the second adsorption device, are enabled.

According to a tenth aspect of the invention, there is provided a cooling generation method for generating cooling in an evaporator by supplying adsorbate vapor from an evaporator at different respective pressures to a first adsorption device and a second adsorption device that each adsorbs an adsorbate, and that each regenerates on heating to a regeneration temperature or above.

In this cooling generation method, the evaporator generates cooling by evaporating the adsorbate. The adsorbate vapor is adsorbed by the first adsorption device and the second adsorption device. The first adsorption device regenerates on heating to the regeneration temperature of the first adsorption device or above. The second adsorption device regenerates on heating to the regeneration temperature of the second adsorption device or above. Regeneration enables the first adsorption device and the second adsorption device to adsorb adsorbate vapor again.

The evaporator supplies the adsorbate vapor to the first adsorption device and the second adsorption device at different respective pressures, and the adsorbate is adsorbed. The pressure (relative pressure) of at least one out of the first adsorption device or the second adsorption device can thus be raised during adsorption, enabling more of the adsorbate to be adsorbed by the adsorbent, and thereby enabling efficient cooling generation. Using an adsorbent with a small temperature difference between adsorption and desorption enables loss due to sensible heat to be reduced during adsorption and desorption.

According to an eleventh aspect of the present invention, in the tenth aspect of the cooling generation method, the second adsorption device may be regenerated utilizing heat of adsorption of the first adsorption device.

Namely, utilizing the heat of adsorption of the first adsorption device in regeneration of the second adsorption device enables effective utilization of the heat of adsorption of the first adsorption device.

According to a twelfth aspect of the present invention, in the tenth aspect or the eleventh aspect of the cooling generation method, the cooling generation method may comprise a plurality of the second adsorption devices, wherein the plurality of second adsorption devices respectively may switch between adsorption of the vapor supplied from the evaporator, and regeneration utilizing heat received from the first adsorption device.

Accordingly, regenerating the other of the second adsorption device while performing vapor adsorption in a part of the plural second adsorption devices, and switching appropriately therebetween, enables continuous vapor adsorption overall by the plural second adsorption devices.

The present invention configured as described above enables efficient cooling generation.

BRIEF DESCRIPTION OF THE DRAWINGS

Preferred embodiments of the present invention will be described in detail based on the following figures, wherein.

DETAILED DESCRIPTION OF THE INVENTION

Figure 1:
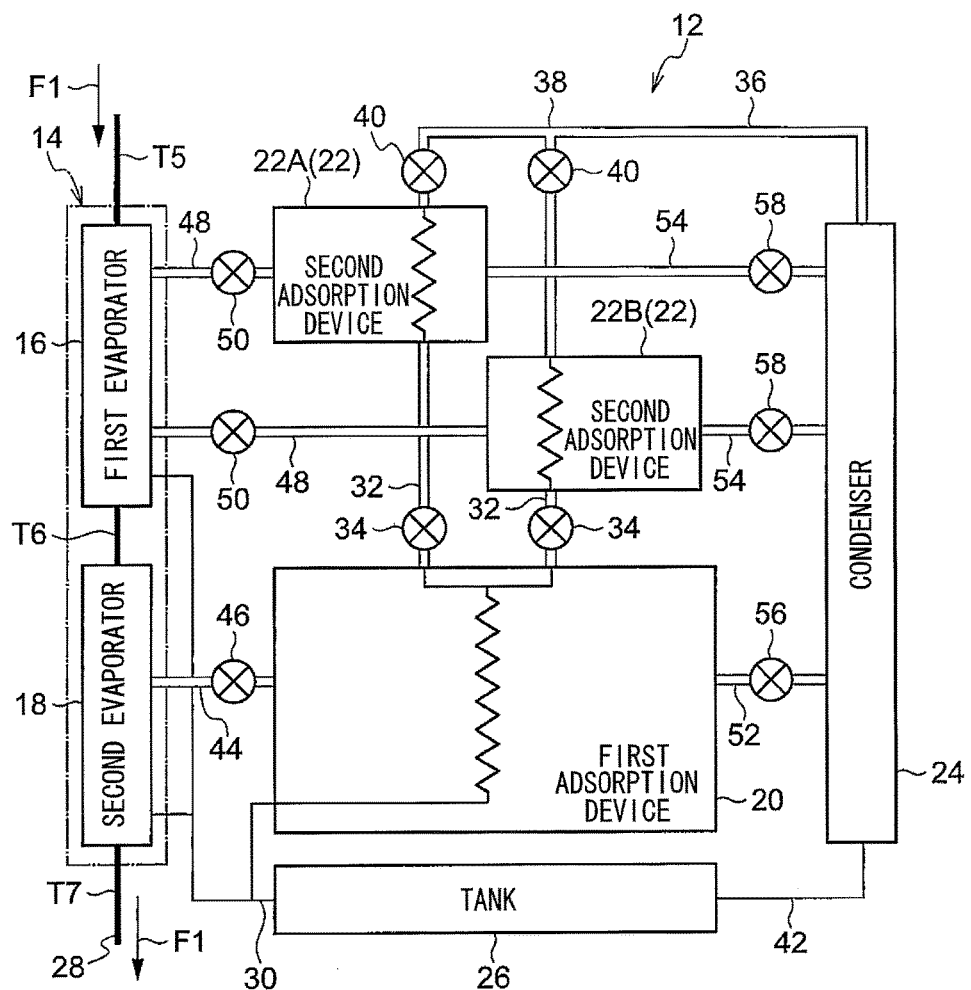
FIG. 1 is a schematic view illustrating a configuration of an adsorption heat pump system of a first exemplary embodiment of the present invention.

FIG. 1 illustrates an adsorption heat pump system (abbreviated to "heat pump" below) 12 of a first exemplary embodiment of the present invention.

The heat pump 12 includes an evaporator 14, a first adsorption device 20, second adsorption devices 22, a condenser 24, and a tank 26. Specifically, in the first exemplary embodiment, a single first adsorption device 20, and two of the second adsorption devices 22, are provided. In the following explanation, the two second adsorption devices 22 are respectively referred to as the second adsorption device 22A and the second adsorption device 22B when discrimination is made therebetween. Note that it is sufficient to provide plural of the second adsorption devices 22, and three or more may be present.

The evaporator 14 includes a first evaporator 16 and a second evaporator 18. The first evaporator 16 and the second evaporator 18 are installed along a fluid pipe 28 through which a heat exchange fluid flows in the direction of arrow F1. Namely, the first evaporator 16 and the second evaporator 18 are connected together in series along the flow direction of the heat exchange fluid. The heat of evaporation when an adsorbate is evaporated inside the first evaporator 16 and the second evaporator 18 enables the first evaporator 16 and the second evaporator 18 to operate to absorb energy (an amount of heat) from the heat exchange fluid (cooling generation). During operation of the heat pump 12, the temperature of the heat exchange fluid drops from T5 (for example 30° C.) to T6 (for example 22° C.) as it passes the first evaporator 16, and then drops from T6 to T7 (for example 15° C.) as it passes the second evaporator 18. The inside of the first evaporator 16 is at a higher pressure than the inside of the second evaporator 18. Namely, in the first exemplary embodiment, the first evaporator 16 functions as a high pressure chamber and the second evaporator 18 functions as a low pressure chamber of the evaporator 14.

The tank 26 is connected to the first evaporator 16, the second evaporator 18, and the first adsorption device 20, through supply pipes 30. A heat transfer medium inside the tank 26 is conveyed to the first evaporator 16, the second evaporator 18, and the first adsorption device 20. Water is employed as the heat transfer medium, and the water is conveyed from the tank 26 to the first evaporator 16, the second evaporator 18, and the first adsorption device 20 in liquid form. Inside the first adsorption device 20, reaction heat generated by an adsorbent adsorbing the adsorbate evaporates the heat transfer medium.

Both of the two second adsorption devices 22 are connected to the first adsorption device 20 through vapor pipes 32, so as to be respectively connected to the first adsorption device 20 in series along the heat transfer medium flow path (such that the two second adsorption devices 22 are parallel to each other). The vapor pipes 32 are opened and closed by vapor valves 34, and in an open state, the vaporized heat transfer medium flows from the first adsorption device 20 to the second adsorption device 22. Specifically, in the first exemplary embodiment, the heat transfer medium can be selectively conveyed from the first adsorption device 20 to either one of the two second adsorption devices 22.

Return flow pipes 36 extend out from each of the two second adsorption devices 22. On the side of the second adsorption devices 22, the respective return flow pipes 36 merge partway at a flow merge portion 38. The return flow pipes 36 that combine into a single pipe at the flow merge portion 38 are connected to the condenser 24. Return flow valves 40 are provided between the respective second adsorption devices 22 and the flow merge portion 38, and in an open state thereof, the vaporized heat transfer medium flows from the second adsorption devices 22 to the condenser 24. Specifically, in the first exemplary embodiment, the heat transfer medium can be selectively conveyed to the condenser 24 from either one of the two second adsorption devices 22.

The condenser 24 and the tank 26 are connected together by a return pipe 42, enabling the heat transfer medium condensed (turned to liquid) in the condenser 24 to return to the tank 26.

The second evaporator 18 and the first adsorption device 20 are connected together through a first pipe 44. The first pipe 44 is opened and closed by a first valve 46, and in an open state thereof, the adsorbate (vapor in the first exemplary embodiment) flows from the second evaporator 18 to the first adsorption device 20. The adsorbent inside the first adsorption device 20 adsorbs the adsorbate vapor; however on heating to the regeneration temperature or above, the adsorbate evaporates from the adsorbent, and the first adsorption device 20 regenerates.

The first evaporator 16 is connected to the respective second adsorption devices 22 through second pipes 48. The second pipes 48 are opened and closed by second valves 50, and in an open state thereof, the adsorbate (vapor in the first exemplary embodiment) flows from the first evaporator 16 to the respective second adsorption devices 22. Specifically, in the first exemplary embodiment, the adsorbate can be selectively conveyed from the first evaporator 16 to either one of the two second adsorption devices 22. The adsorbate vapor is adsorbed by the adsorbent inside the second adsorption devices 22; however on heating to the regeneration temperature or above, the adsorbate evaporates from the adsorbent and the second adsorption devices 22 regenerate.

The first adsorption device 20 and the second adsorption devices 22 are respectively connected to the condenser 24 through vapor pipes 52, 54. The respective vapor pipes 52, 54 are opened and closed by vapor valves 56, 58, and in an open state thereof, the vaporized adsorbate (more specifically, vapor) generated during regeneration of the first adsorption device 20 and the second adsorption devices 22 can be returned to the condenser 24.

In the first exemplary embodiment, the adsorption capacity of the first adsorption device 20 is set larger than the adsorption capacity of the second adsorption devices 22 (for example twice the size or greater, and preferably ten times the size or greater).

A controller, not illustrated in the drawings, controls the opening and closing of the respective valves.

In the first exemplary embodiment, the first adsorption device 20 and the second adsorption devices 22 contain different adsorbents to each other. For example, the adsorbent in the first adsorption device 20 may be CaO, and the adsorbent in the second adsorption devices 22 may be RD silica gel (or ALPO5, described later).

Figure 3:
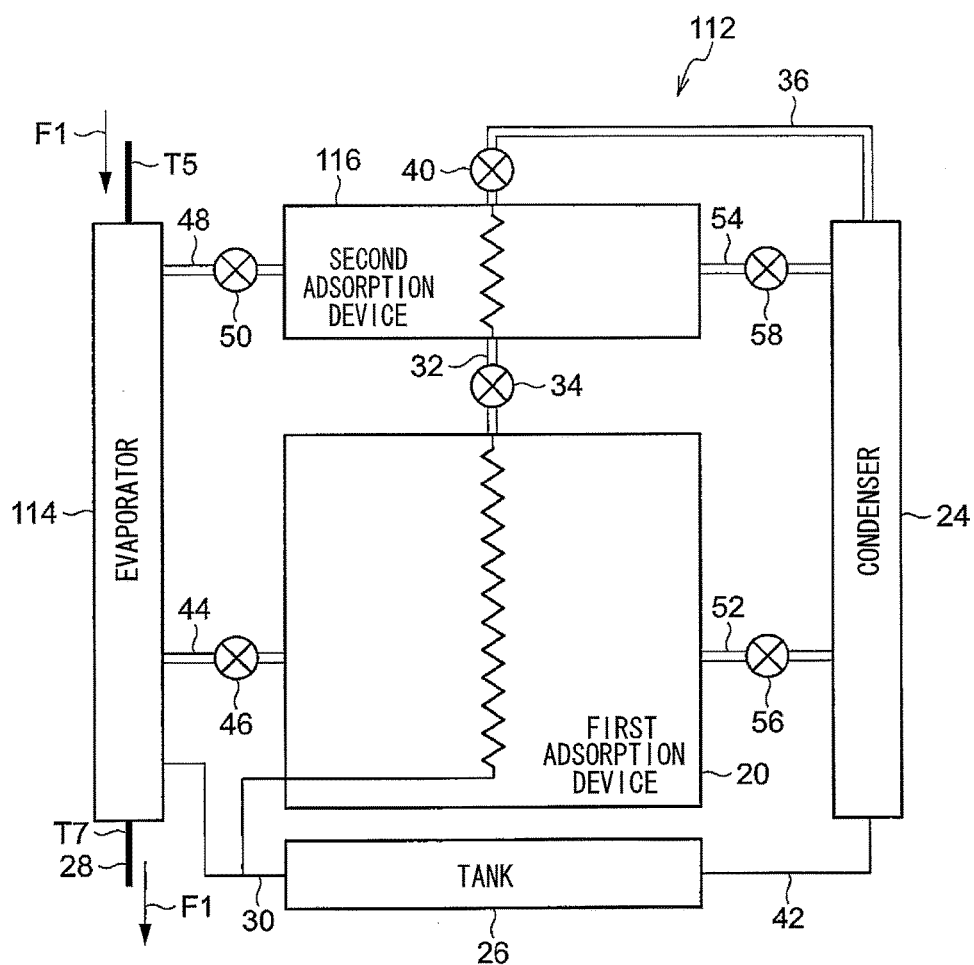
FIG. 3 is a schematic view illustrating a configuration of an adsorption heat pump system of a first comparative example.

Explanation follows regarding operation, and a cooling generation method, of the first exemplary embodiment, drawing comparisons with operation and a cooling generation method of a first comparative example, illustrated in FIG. 3. In a heat pump 112 of the first comparative example, members equivalent to those of the heat pump 12 of the first exemplary embodiment are allocated the same reference numerals, and detailed explanation thereof is omitted.

A high pressure chamber and a low pressure chamber are not provided inside an evaporator 114 of the heat pump 112 of the first comparative example, which has only a single pressure chamber. The temperature of heat exchange fluid passing through the fluid pipe 28 drops from T5 (for example 30° C.) to T7 (for example 15° C.) as it passes through the evaporator 114.

The adsorption heat pump 112 of the first comparative example includes a single second adsorption device 116. Vapor from the first adsorption device 20 flows through the vapor pipe 32 to the second adsorption device 116.

Figure 4A:
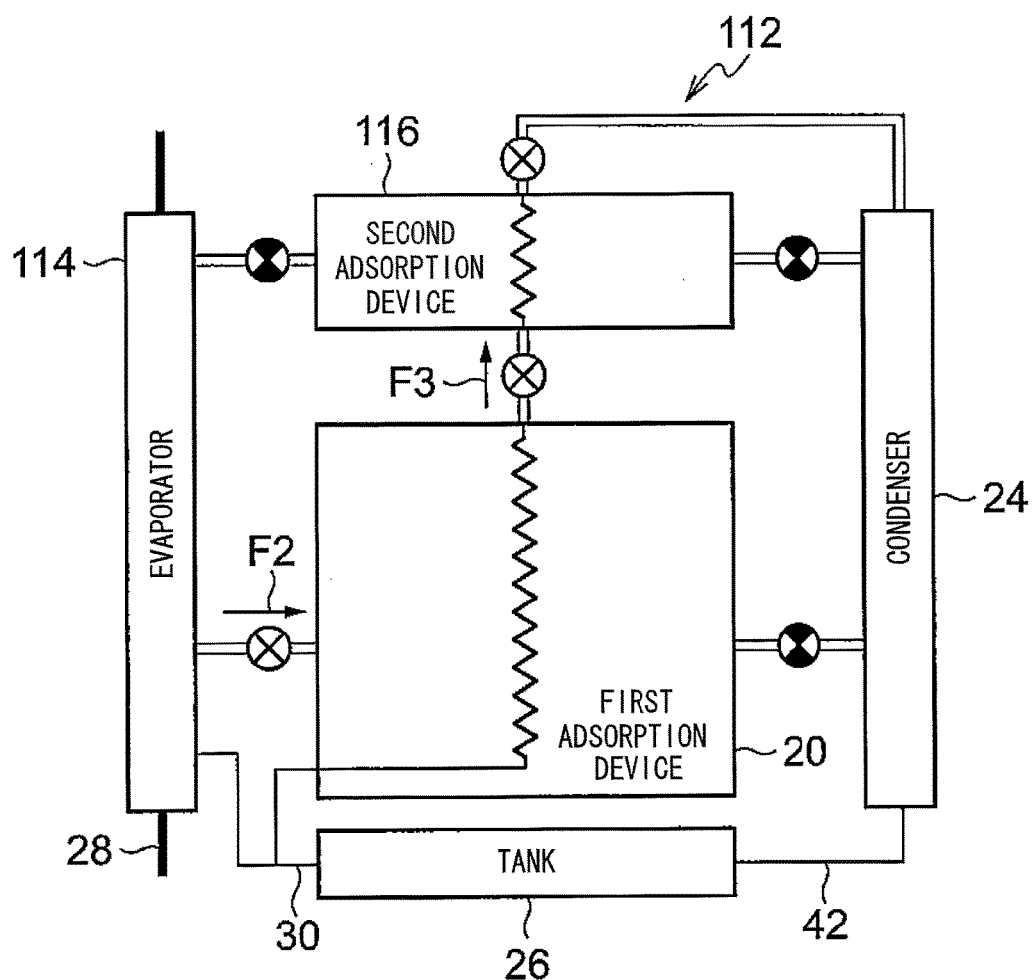
FIG. 4A is an explanatory drawing illustrating an operational state of an adsorption heat pump system of the first comparative example.

In the heat pump 112 of the first comparative example, in order to generate cooling from a regenerated state of the adsorbent in the first adsorption device 20, first, as illustrated by arrow F2 in FIG. 4A, vapor from the evaporator 114 is adsorbed by the adsorbent of the first adsorption device 20, generating cooling in the evaporator 114. The temperature of the heat exchange fluid passing through the evaporator 114 drops from T5 (for example 30° C.) to T7 (for example 15° C.).

Reaction heat generated during adsorption of the vapor by the adsorbent of the first adsorption device 20 evaporates water (water conveyed from the tank 26), serving as the heat transfer medium, in the first adsorption device 20. The vapor is then conveyed to the second adsorption device 116 as illustrated by the arrow F3. The second adsorption device 116 is regenerated by receiving the heat of the vapor (for example, at approximately 80° C.).

Figure 4B:
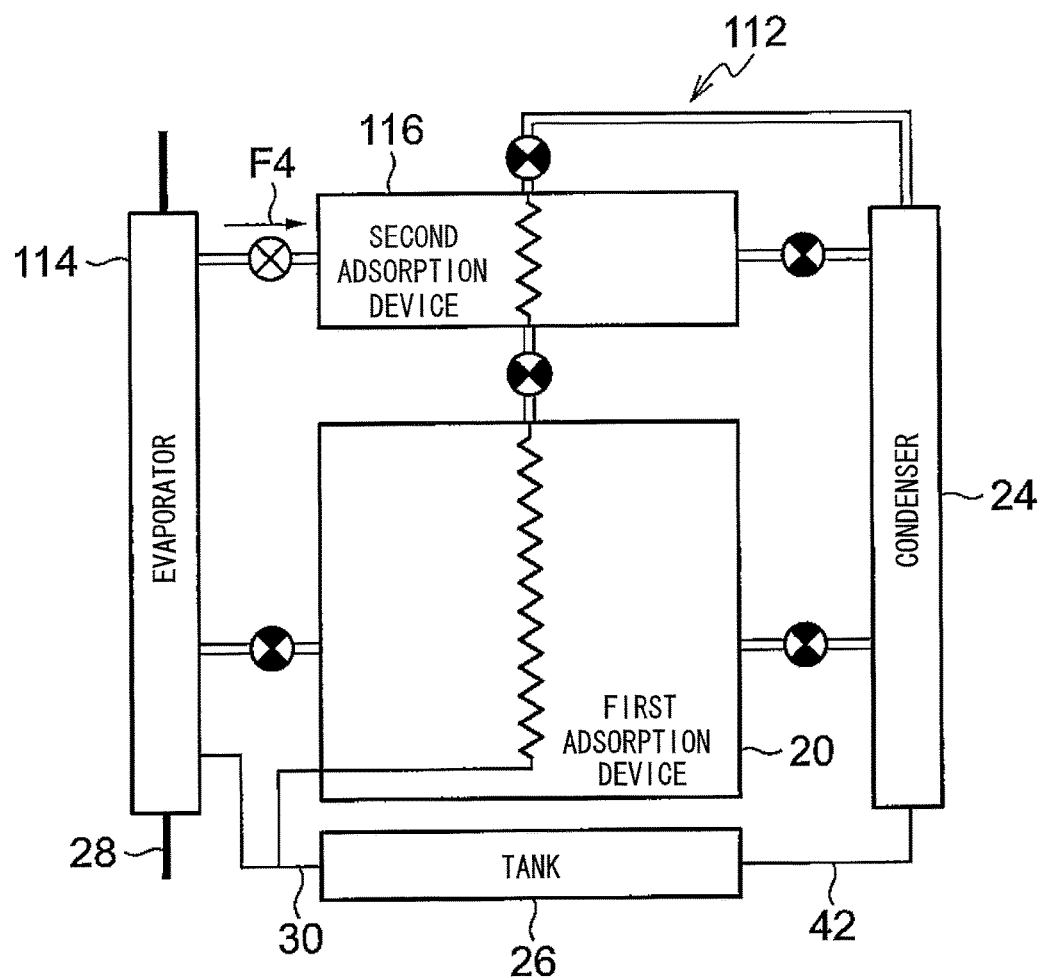
FIG. 4B is an explanatory drawing illustrating an operational state of an adsorption heat pump system of the first comparative example.

As illustrated by arrow F4 in FIG. 4B, vapor from the evaporator 114 is adsorbed by the adsorbent of the regenerated second adsorption device 116, generating cooling in the evaporator 114. However, when this occurs, the evaporator 114 has already dropped to 15° C., and so the second adsorption device 116 requires the ability to reduce the pressure of the evaporator 114 to a pressure corresponding to a temperature of 15° C. or below.

In the first comparative example, regeneration of the first adsorption device 20 utilizes waste heat acting from outside the first adsorption device 20, for example.

In contrast thereto, when employing the heat pump 12 of the first exemplary embodiment, cooling is generated from a state in which the adsorbent of the first adsorption device 20 has been regenerated, by the following process.

Figure 2A:
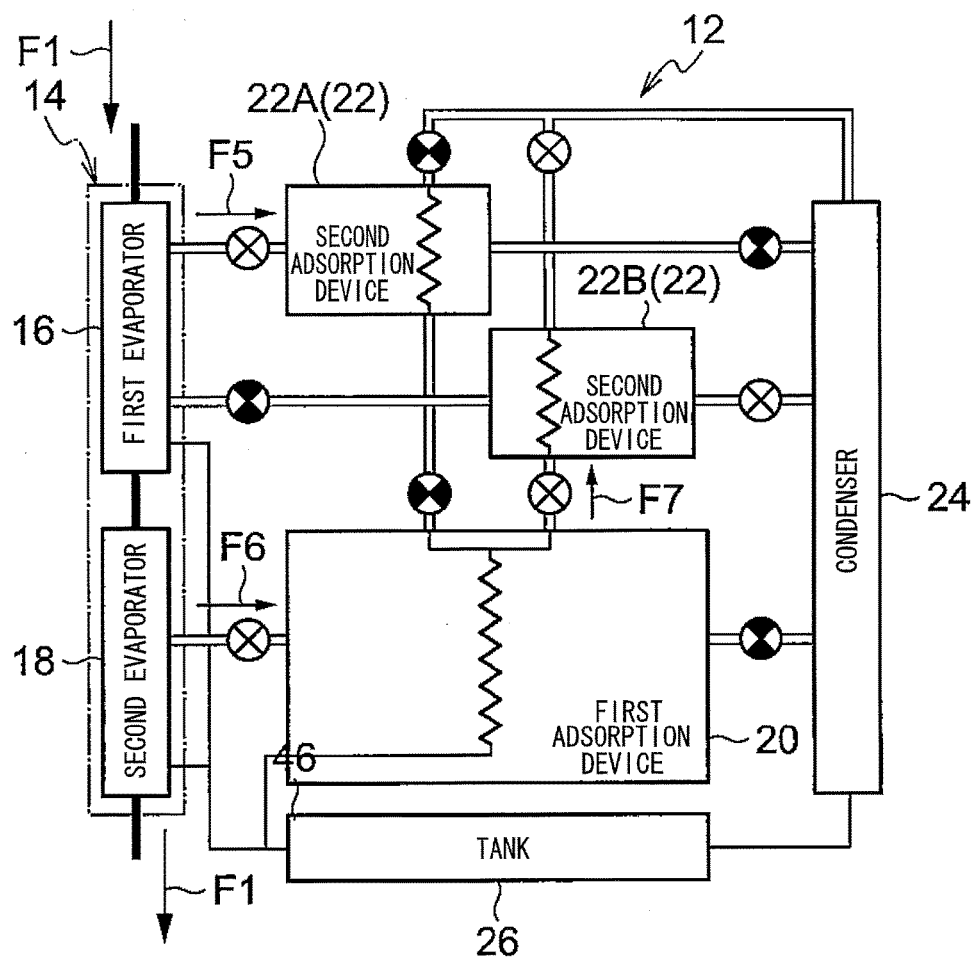
FIG. 2A is an explanatory drawing illustrating an operational state of an adsorption heat pump system of the first exemplary embodiment of the present invention.

First, as illustrated by arrow F5 in FIG. 2A, vapor from the first evaporator 16 is adsorbed by the adsorbent of either one of the second adsorption devices 22 (here, the second adsorption device 22A), generating cooling in the first evaporator 16. The temperature of the heat exchange fluid passing through the first evaporator 16 drops from T5 (for example 30° C.) to T6 (for example 22° C.), for example.

In parallel to cooling generation in the first evaporator 16, or after cooling generation, as illustrated by arrow F6, vapor from the second evaporator 18 is adsorbed by the adsorbent of the first adsorption device 20, generating cooling in the second evaporator 18. The temperature of the heat exchange fluid passing through the second evaporator 18 drops from T6 (for example 22° C.) to T7 (for example 15° C.).

When this occurs, heat of adsorption is generated in the first adsorption device 20 due to adsorption of the adsorbate. The heat of adsorption evaporates water (water conveyed from the tank 26) serving as a heat transfer medium, and the vapor is conveyed to the second adsorption device 22B as illustrated by arrow F7, thereby regenerating the adsorbent of the second adsorption device 22B. Namely, vapor adsorption in the first adsorption device 20 is performed in parallel to regeneration of the second adsorption device 22B.

Figure 2B:
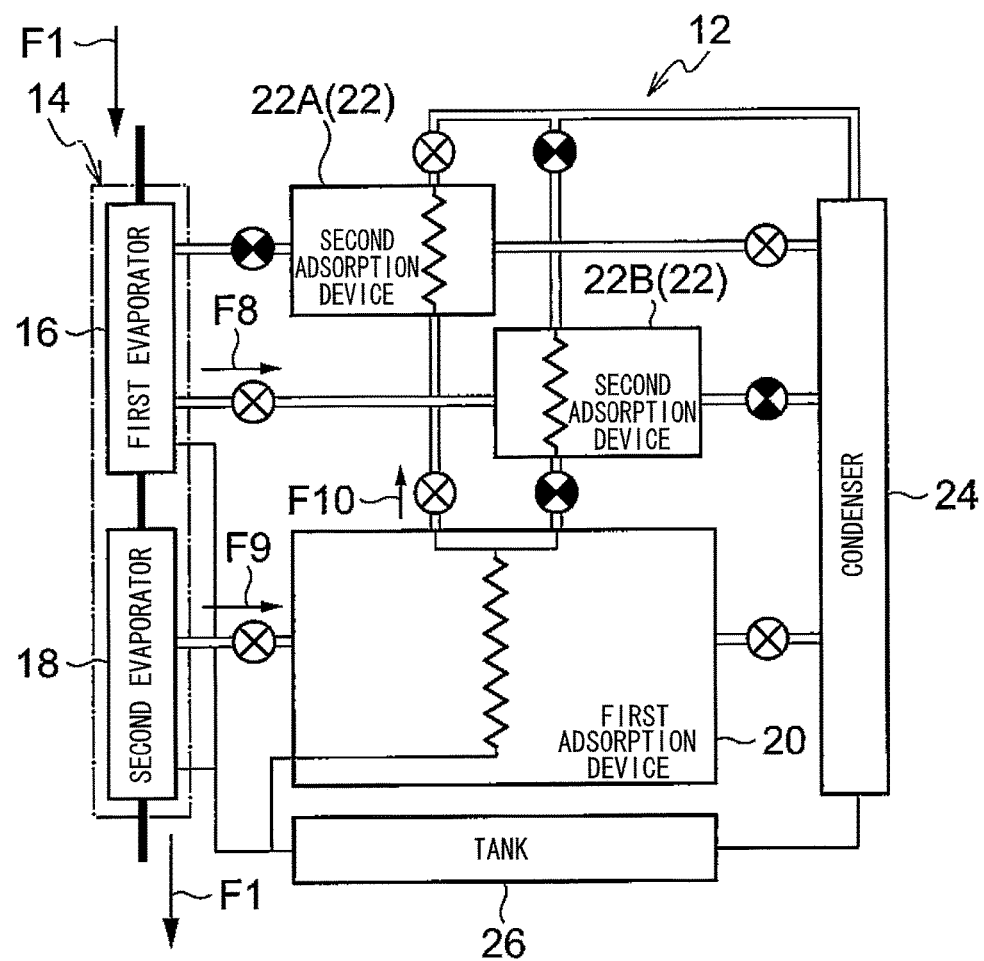
FIG. 2B is an explanatory drawing illustrating an operational state of an adsorption heat pump system of the first exemplary embodiment of the present invention.

During regeneration of the adsorbent of the second adsorption device 22B, or after the regeneration, vapor from the first evaporator 16 is adsorbed by the adsorbent of the second adsorption device 22B as illustrated by arrow F8 in FIG. 2B, thereby generating cooling in the first evaporator 16. Parallel to the cooling generation in the first evaporator 16, or after the cooling generation, the vapor from the second evaporator 18 is adsorbed by the adsorbent in the first adsorption device 20, as illustrated by the arrow F9, thereby generating cooling in the second evaporator 18. As illustrated by the arrow F10, the heat of adsorption (vapor) in the first adsorption device 20 is conveyed to the second adsorption device 22A, thereby regenerating the adsorbent of the second adsorption device 22A. Namely, vapor adsorption in the first adsorption device 20 is performed in parallel with adsorbent regeneration of the second adsorption device 22A.

More specifically, in the first exemplary embodiment, the adsorption capacity of the first adsorption device 20 is larger than the adsorption capacity of the second adsorption devices 22 (for example twice the size or greater, and preferably ten times the size or greater). Accordingly, as described above, adsorption of the adsorbate and regeneration can be performed in the two second adsorption devices 22 while the first adsorption device 20 continuously or intermittently adsorbs the adsorbate.

In the first exemplary embodiment, regeneration of the first adsorption device 20 utilizes, for example, waste heat acting from outside the first adsorption device 20 when the heat pump 12 is inactive.

Figure 5:
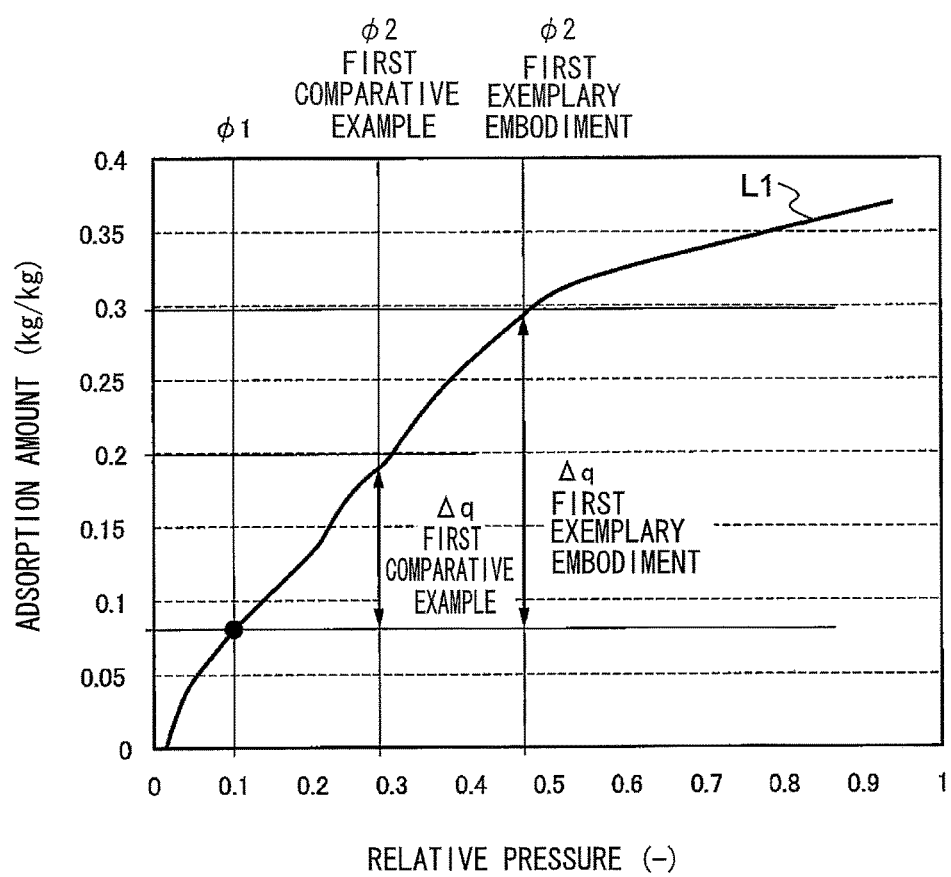
FIG. 5 is a graph illustrating an adsorption isotherm of silica gel.

FIG. 5 illustrates a relationship between relative pressure and adsorption amount in the first exemplary embodiment and the first comparative example. The curve of the graph in FIG. 5 is the adsorption isotherm L1 of RD silica gel (an example of the adsorbent of the second adsorption devices 22) at a specific temperature (25° C. in this example). The following temperatures T1, T2, T3, T4 are introduced to define the relative pressures $\Phi1$, $\Phi2$ in FIG. 5 using the equations below.

T1=regeneration temperature of second adsorption devices 22

T2=temperature of condenser 24

T3=cooled temperature of second adsorption devices 22

T4=temperature of evaporator 14 after cooling

As a specific example, T1=80° C., T2=35° C., T3=35° C., T4=22° C. (first exemplary embodiment), 15° C. (first comparative example).

P represents the saturated vapor pressure at each of the temperatures. Wherein:

$\Phi1 = P(T2)/P(T1)$; and $\Phi2 = P(T4)/P(T3)$.

More specifically:

$\Phi1 = P(35° C.)/P(80° C.)$;

$\Phi2(\text{first comparative example}) = P(15° C.)/P(35° C.)$; and $\Phi2(\text{first exemplary embodiment}) = P(22° C.)/P(35° C.)$.

The difference in adsorption amounts between a state with a relative pressure of $\Phi2$ and a state with a relative pressure of $\Phi1$ is effectively the adsorption amount which the adsorbent is capable of adsorbing.

As can be seen from FIG. 5, $\Phi2$ in the first exemplary embodiment is 0.5, higher than the $\Phi2$ of 0.3 in the first comparative example. Since the adsorption isotherm L1 increases monotonically, the adsorption amount $\Delta q$ in the first exemplary embodiment is greater than the adsorption amount $\Delta q$ of the first comparative example. Namely, in the first exemplary embodiment, more of the adsorbate can be adsorbed than in the first comparative example, increasing the utilization efficiency of the adsorbent. In other words, in the graph of FIG. 5, the position of $\Phi2$ in the first exemplary embodiment is further to the right side than the position of $\Phi2$ in the first comparative example.

Figure 6:
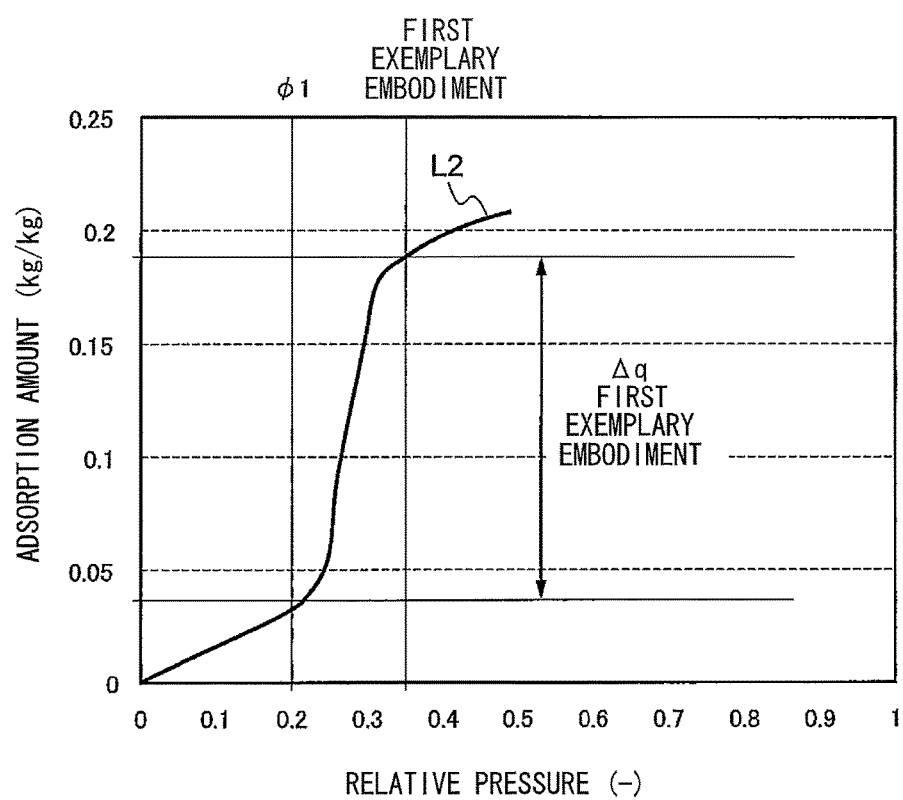
FIG. 6 is a graph illustrating an adsorption isotherm of ALPO5.

An adsorbent following the adsorption isotherm L2 illustrated in FIG. 6 may be considered for use as the adsorbent of the second adsorption devices 22, instead of the RD silica gel described above. ALPO5 is an example of an adsorbent exhibiting the adsorption isotherm characteristics illustrated in FIG. 6. In such cases, a zeolite, for example, may be employed as the adsorbent of the first adsorption device 20.

An adsorbent exhibiting the adsorption isotherm characteristics illustrated in FIG. 6 shows a gentle increase in adsorption amount up to a relative pressure of 0.2, and a large increase in the adsorption amount between relative pressures of 0.2 and 0.35. At relative pressures in excess of 0.35, the increase in adsorption amount becomes gentle once again. An adsorbent exhibiting the adsorption isotherm characteristics illustrated in FIG. 6 can therefore obtain a sufficiently large adsorption amount Δq even with settings of Φ1=0.2 and Φ2=0.35. Φ1=0.2 enables settings of, for example, T1=75° C., T2=40° C., T3=40° C., T4=22° C.

Consider the temperature difference ΔT=T1−T3 in the second adsorption devices 22. The temperature difference ΔT is the temperature difference (temperature swing) when driving the second adsorption devices 22. The smaller the value of ΔT, the less heat is lost as sensible heat (unusable) during adsorption and desorption of the adsorbate in the second adsorption devices 22. Namely, employing an adsorbent with the adsorption isotherm characteristics illustrated in FIG. 6 enables a smaller difference between T1 and T3 than when employing an adsorbent with the adsorption isotherm characteristics illustrated in FIG. 5, and so the amount of heat lost as sensible heat during adsorption and desorption of the adsorbate is reduced, thus raising the efficiency of cooling generation.

Explanation follows regarding a second exemplary embodiment of the present invention.

Figure 7:
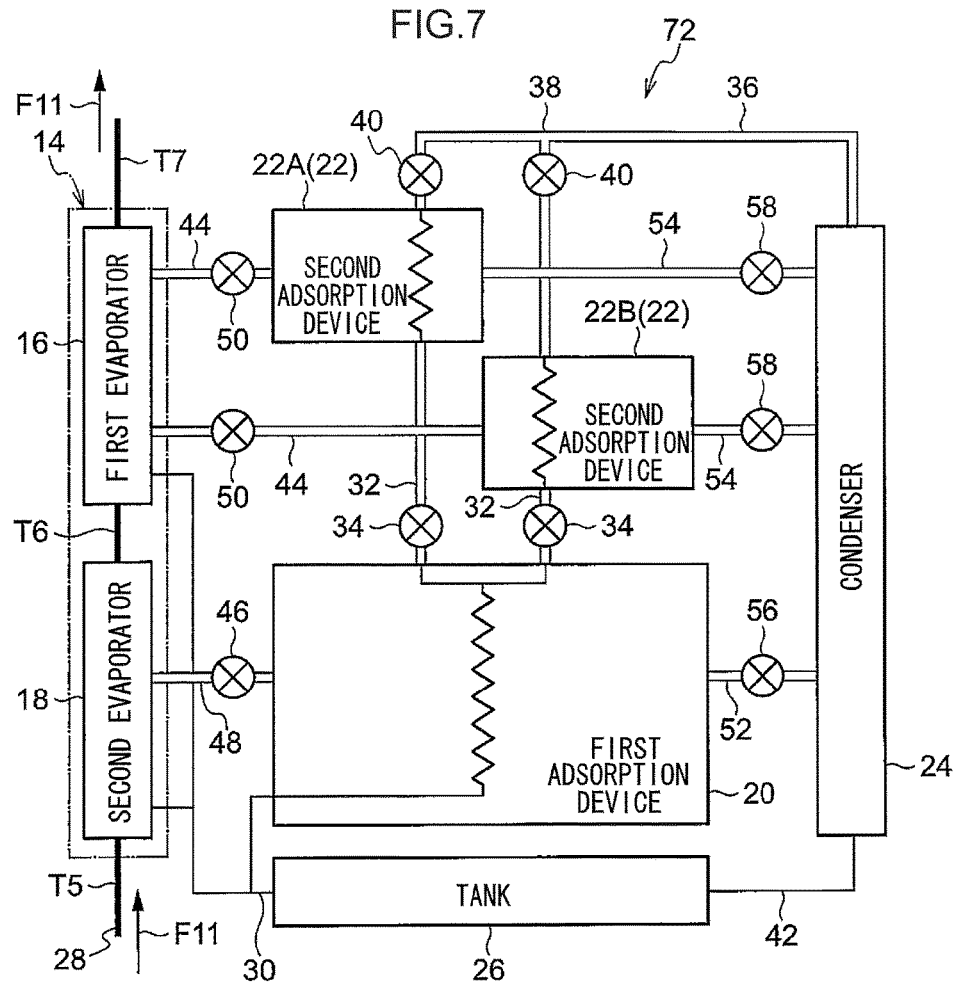
FIG. 7 is a schematic view illustrating a configuration of an adsorption heat pump system of a second exemplary embodiment of the present invention.

FIG. 7 illustrates a heat pump 72 of the second exemplary embodiment. In the second exemplary embodiment, configuration elements, members, etc. equivalent to those of the first exemplary embodiment are allocated the same reference numerals, and detailed explanation thereof is omitted.

In the second exemplary embodiment, the flow direction of the heat exchange fluid between the first evaporator 16 and the second evaporator 18 is the direction indicated by arrow F11, namely the opposite direction to in the first exemplary embodiment. The temperature of the heat exchange fluid accordingly drops from T5 (for example 30° C.) to T6 (for example 22° C.) as it passes through the second evaporator 18, and drops from T6 to T7 (for example 15° C.) as it passes through the first evaporator 16.

In the second exemplary embodiment, the pressure between the first adsorption device 20 and the second evaporator 18 is higher than in the first exemplary embodiment. Namely, in the evaporator 14 of the second exemplary embodiment, the second evaporator 18 functions as a high pressure chamber, and the first evaporator 16 functions as a low pressure chamber. The first pipe 44 connects together the first evaporator 16 and the second adsorption devices 22, and the second pipe 48 connects together the second evaporator 18 and the first adsorption device 20.

The reaction temperature during adsorption in the first adsorption device 20 is higher than in the first exemplary embodiment. The temperature of the vapor conveyed from the first adsorption device 20 to the second adsorption devices 22 also becomes higher the higher the reaction temperature of the first adsorption device 20, raising the regeneration temperature in the second adsorption devices 22.

Figure 9:
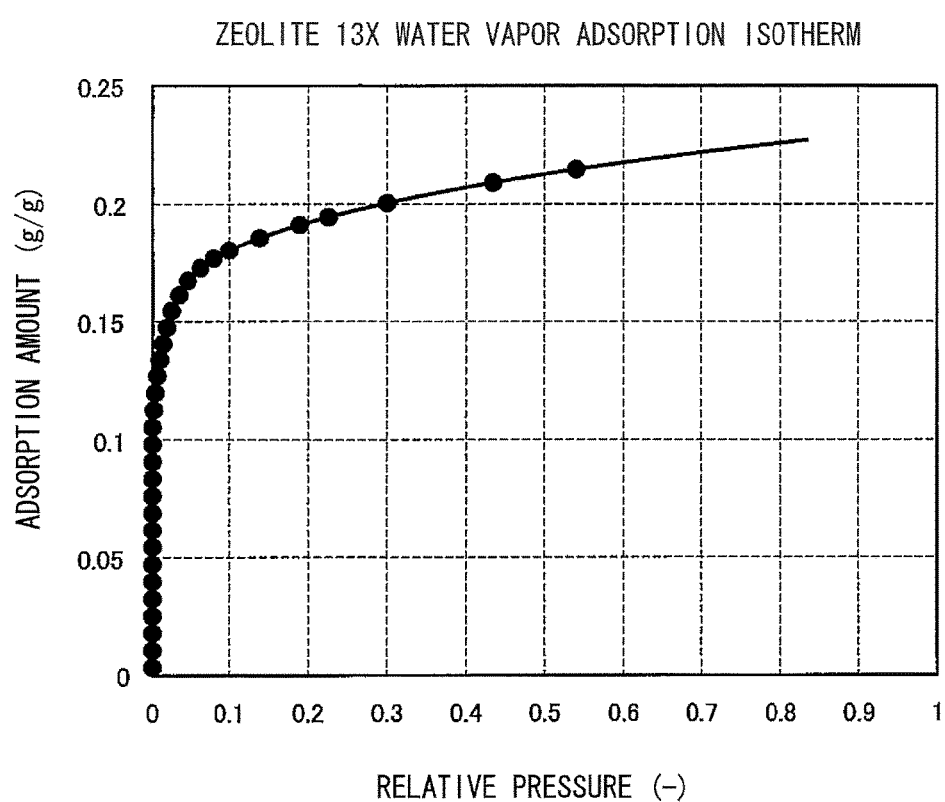
FIG. 9 is a graph illustrating an adsorption isotherm of zeolite 13X.
Figure 10:
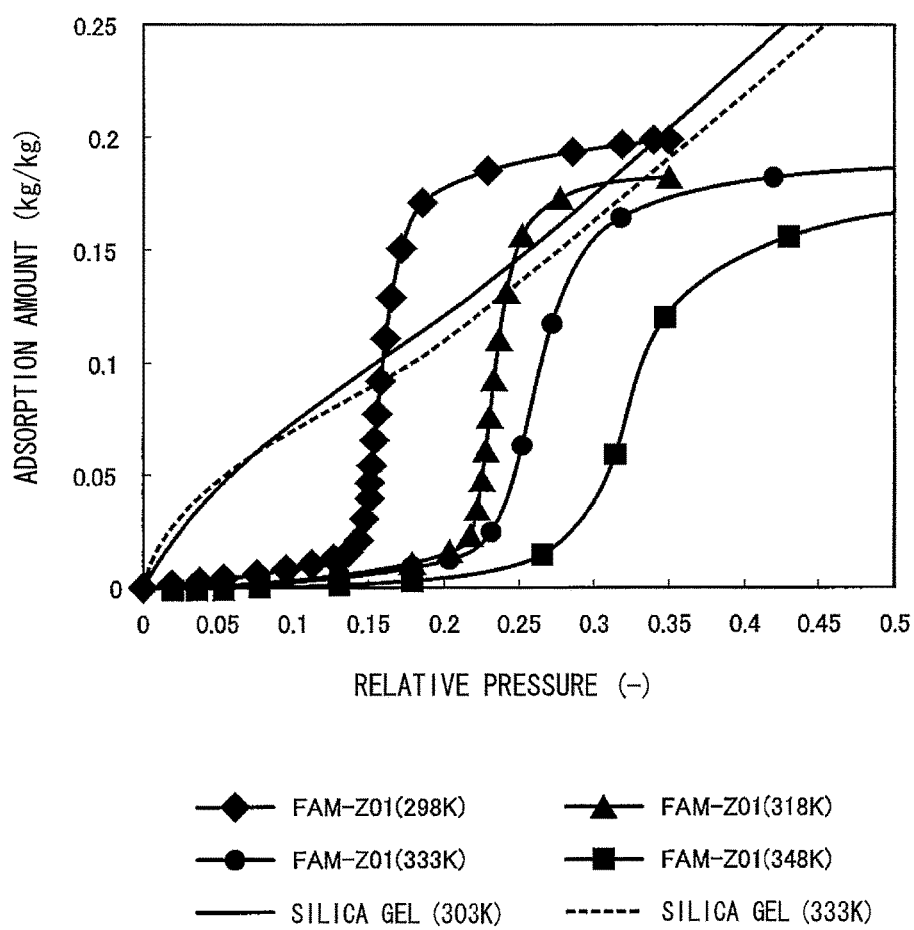
FIG. 10 is a graph illustrating adsorption isotherms of FAM-Z01 and silica gel.

FIG. 9 illustrates an adsorption isotherm of an adsorbent that may be employed in the first adsorption device 20 of the second exemplary embodiment (more specifically, a zeolite 13X). FIG. 10 illustrates adsorption isotherms of adsorbents that may be employed in the second adsorption devices 22 in the second exemplary embodiment (more specifically, FAM Z01 (trade name belonging to Mitsubishi Plastics, Inc.) and silica gel).

As can be seen from FIG. 10, in the second exemplary embodiment the FAM Z01 and silica gel, adsorbents of the second adsorption devices 22, are adsorbents with adsorption isotherm characteristics that shift toward the right side of the graph accompanying an increase in temperature. Namely, such adsorbents regenerate more easily the higher the regeneration temperature. In the second exemplary embodiment, since the reaction temperature of the first adsorption device 20 is higher than in the first exemplary embodiment, the regeneration temperature of the second adsorption devices 22 is higher, thus facilitating regeneration.

Specifically, the adsorption isotherms of FAM Z01 shift strongly to the right side of FIG. 10 accompanying increase in temperature, making them preferable materials for use as the adsorbent of the second adsorption devices 22 in the second exemplary embodiment.

Figure 8:
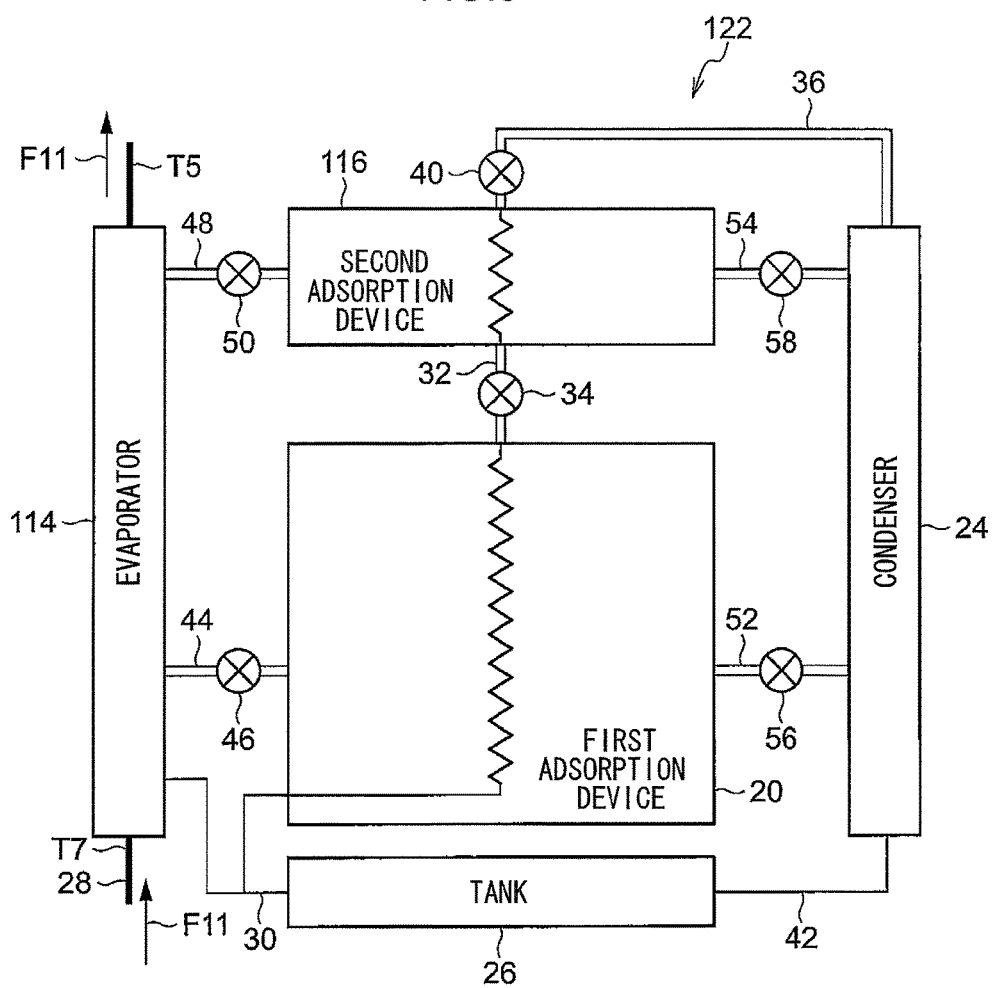
FIG. 8 is a schematic view illustrating a configuration of an adsorption heat pump system of a second comparative example.

FIG. 8 illustrates a heat pump 122 of a second comparative example. The heat pump 122 of the second comparative example has substantially the same configuration as the heat pump 72 of the first comparative example; however, similarly to in the second exemplary embodiment, the flow direction of the heat exchange fluid in the first evaporator 16 and the second evaporator 18 is the direction indicated by arrow F11, namely the opposite direction to in the first comparative example. The adsorbent of the first adsorption device 20 and the adsorbent of the second adsorption device 116 of the second comparative example are the same as those of the second exemplary embodiment.

In the second comparative example, supposing, as an example, that adsorption was performed up to the adsorption amount at a relative pressure of 0.05 in an adsorption reaction in the first adsorption device 20, then the first adsorption device 20 and the second adsorption device 116 would each be driven at a saturated vapor pressure at 15° C. Were the first adsorption device 20 to rise to a specific temperature T8 (for example 72° C.), then the second adsorption devices 22 would also regenerate at the temperature T8.

By contrast, suppose that in the second exemplary embodiment, similarly to in the second comparative example, that adsorption was performed up to an adsorption amount at a relative pressure of 0.05 in an adsorption reaction in the first adsorption device 20. In such cases, the temperature of the first adsorption device 20 could be raised to a temperature T9 (for example 83° C.), higher than the temperature T8 of the second comparative example, thereby making it easy to regenerate the second adsorption devices 22. Moreover, in the second exemplary embodiment, in cases in which the regeneration temperature of the second adsorption devices 22 is sufficient even below T9, then, for example, when regenerating the second adsorption devices 22 at the temperature T8, adsorption is possible at a relative pressure of up to approximately 0.08 in an adsorption reaction of the first adsorption device 20, thereby increasing the adsorption amount.

Examples have been given above of a structure in which the evaporator 14 is divided into the first evaporator 16 and the second evaporator 18; however, in essence, it is sufficient for the inside of the evaporator 14 to be partitioned by a partitioning member such as a partitioning wall to configure a high pressure chamber and a low pressure chamber. In the example illustrated in FIG. 1, opposing faces of the first evaporator 16 and the second evaporator 18 respectively function as a partitioning member. A high pressure chamber and a low pressure chamber can be configured inside the evaporator 14 by the simple structure of providing a partitioning member.

Vapor from the first evaporator 16 can be conveyed to the second adsorption devices 22 by the simple structure of connecting together the first evaporator 16 and the second adsorption devices 22 with the second pipes 48. Similarly, vapor from the second evaporator 18 can be conveyed to the first adsorption device 20 by the simple structure of connecting together the second evaporator 18 and the first adsorption device 20 with the first pipe 44.

The vapor supply member of the present invention is not limited to the evaporator 14, and in essence, it is sufficient that vapor can be supplied to the first adsorption device 20 and the second adsorption devices 22 at different vapor pressures. Employing the evaporator 14 as the vapor supply member as in the above exemplary embodiments enables efficient cooling generation from evaporation of the adsorbate in the evaporator 14, and efficient vapor supply.

As is clear from the above explanation, the present invention employs, for example, waste heat acting from the outside in regeneration of the first adsorption device 20. The heat pump therefore does not require a heat source for regeneration of the first adsorption device 20. The heat pump of the present invention may, of course, be provided with such a heat source.

Embodiments of the present invention are described above, but the present invention is not limited to the embodiments as will be clear to those skilled in the art.

What is claimed is:

1. An adsorption heat pump system comprising:
    a single first adsorption device that adsorbs an adsorbate, and that regenerates on heating to a regeneration temperature or above;
    a second adsorption device that adsorbs the adsorbate, and that regenerates on heating to the regeneration temperature or above;
    a vapor supply member that evaporates the adsorbate and supplies adsorbate vapor to the first adsorption device and the second adsorption device at different respective pressures,
    the vapor supply member including:
        an evaporator provided with a high pressure chamber and a low pressure chamber having different operating pressures;
        a first pipe connecting the adsorption device to either the high pressure chamber or the low pressure chamber; and
        a second pipe connecting the second adsorption device to the other of the high pressure chamber or the low pressure chamber; and
        a vapor pipe,
            wherein the second adsorption device is directly connected to the first adsorption device by way of the vapor pipe,
        wherein the adsorption capacity of the first adsorption device is greater than the adsorption capacity of the second adsorption device.

2. The adsorption heat pump system of claim 1, wherein the evaporator includes a partitioning member partitioning between the high pressure chamber and the low pressure chamber.

3. The adsorption heat pump system of claim 1, wherein an adsorbent in the first adsorption device and an adsorbent in the second adsorption device have different characteristics to each other.

4. The adsorption heat pump system of claim 1, wherein the second adsorption device is regenerated utilizing heat of adsorption of the first adsorption device.

5. The adsorption heat pump system of claim 1, wherein the first pipe connects the low pressure chamber and the first adsorption device together, and the second pipe connects the high pressure chamber and the second adsorption device together.

6. The adsorption heat pump system of claim 1, comprising a plurality of the second adsorption devices, wherein,
    the plurality of second adsorption devices respectively switch between adsorption of the vapor supplied from the evaporator, and regeneration utilizing heat received from the first adsorption device.

7. The adsorption heat pump system of claim 1, wherein water vapor is a medium for heat transfer from the first adsorption device to the second adsorption device and for cooling the second adsorption device.

8. A cooling generation method for generating cooling in an evaporator using the adsorption heat pump system of claim 1.

9. The cooling generation method of claim 8, wherein the second adsorption device is regenerated utilizing heat of adsorption of the first adsorption device.

10. The cooling generation method of claim 8, comprising a plurality of the second adsorption devices, wherein the plurality of second adsorption devices respectively switch between adsorption of the vapor supplied from the evaporator, and regeneration utilizing heat received from the first adsorption device.

* * * * *

UNITED STATES PATENT AND TRADEMARK OFFICE
CERTIFICATE OF CORRECTION

PATENT NO. : 10,082,321 B2
APPLICATION NO. : 14/625938
DATED : September 25, 2018
INVENTOR(S) : Yasuki Hirota et al.

Page 1 of 1

It is certified that error appears in the above-identified patent and that said Letters Patent is hereby corrected as shown below:

In the Claims

Column 11, Line 39: "A FIRST PIPE CONNECTING THE ADSORPTION DEVICE TO EITHER..."
should be ---A FIRST PIPE CONNECTING THE FIRST ADSORPTION DEVICE TO EITHER...---

Signed and Sealed this
Eleventh Day of December, 2018

Andrei Iancu
*Director of the United States Patent and Trademark Office*